(12) United States Patent
Dietl

(10) Patent No.: US 6,186,915 B1
(45) Date of Patent: Feb. 13, 2001

(54) STEPLESSLY VARIABLE V-PULLEY LOOPING TRANSMISSION

(75) Inventor: Matthias A. Dietl, Munich (DE)

(73) Assignee: Ruey-Zon Chen (TW)

(*) Notice: Under 35 U.S.C. 154(b), the term of this patent shall be extended for 0 days.

(21) Appl. No.: 09/220,783

(22) Filed: Dec. 24, 1998

(30) Foreign Application Priority Data

Mar. 30, 1998 (DE) .......................................... 298 05 792 U

(51) Int. Cl.[7] .............................. F16H 55/66; F16H 7/02; F16H 59/00

(52) U.S. Cl. .................................. 474/8; 474/69; 474/70; 474/13; 474/17

(58) Field of Search ..................................... 474/8–11, 13, 474/6, 17, 7, 24, 30–32, 69, 70, 133, 135, 101, 110, 109, 117, 113, 75, 89

(56) References Cited

U.S. PATENT DOCUMENTS 3,863,514 * 2/1975 Jensen ....................................... 474/13
4,310,082 * 1/1982 Elmy et al. ........................ 192/224 X
4,605,386 * 8/1986 Harris ........................................ 474/8
4,813,921 * 3/1989 Dianda ....................................... 484/8
4,832,661 * 5/1989 Wagner et al. ........................ 474/69
4,838,834 * 6/1989 Miyata ..................................... 474/11
5,387,052 * 2/1995 Artzberger ............................ 474/7 X

FOREIGN PATENT DOCUMENTS

2780128 * 9/1988 (FR) .
282311 * 9/1988 (EP) .

* cited by examiner

Primary Examiner—David A. Bucci
Assistant Examiner—Marcus Charles
(74) Attorney, Agent, or Firm—Thorp Reed & Armstrong, LLP

(57) ABSTRACT

A pulling device transmission includes an stepless V-belt connection two pulleys wherein at least one of the pulleys is an adjusting pulley which is composed by two halves between which the belt runs through. The operative diameter of the adjusting pulley is adjustable relative to the belt plane where the belt runs thereon and the adjusting pulley halves are symmetrically pre-stressed with respect to the belt plane. A variator unit is designed for displacing the travel path of the belt in the respective to the adjusting pulley.

11 Claims, 4 Drawing Sheets

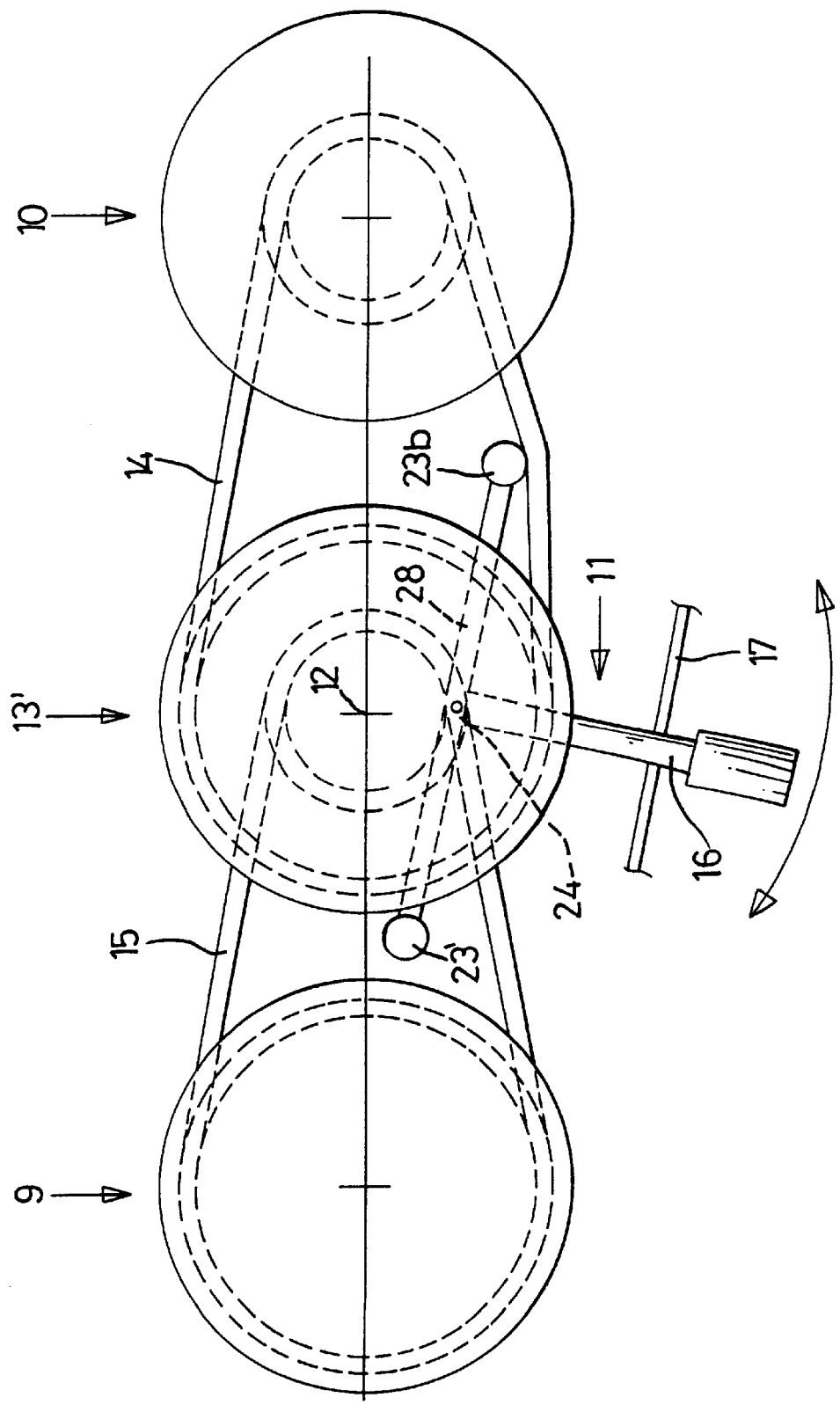

STEPLESSLY VARIABLE V-PULLEY LOOPING TRANSMISSION

BACKGROUND OF THE INVENTION

1. Field of the Invention

The invention concerns a steplessly variable pulling means transmission in which the variation in the transmission ratio is effected by varying the operative diameter of at least one of the pulling means pulleys over which the pulling means runs.

2. Description of the Related Art

The pulling means used can be a belt. For example a V-belt or a round belt. As well as a chain or another link-type belt or band member.

The pulling means pulleys are adapted to the respective pulling means used. In which respect. Particularly when employing round belts and V-belts. Pulleys are used whose substantially axially oriented pulling means running surfaces are slightly inclined with respect to the plane in which the endless pulling means circulates. Those pulling means pulleys whose operative diameter is variable for the purposes of varying the transmission ratio are referred to as adjusting pulleys.

In that respect it is known in the case of the described conical pulling means running surfaces for the adjusting pulley to be composed of two pulley halves which are arranged on respective sides of the plane of the pulling means and the axial spacing of which is variable whereby the operative diameter of that adjusting pulley can also be altered, by virtue of the conical configuration of the running surfaces.

It is likewise also possible for the operative diameter to be varied without axial movement, just by radial movements of the adjusting pulley, for example by virtue of the adjusting pulley being formed by segments which are possibly in mutually overlapping relationship and which are pivotable in the plane of the pulling means or which are displaceable radially relative to the axis of the adjusting pulley.

The simplest form of a pulling means transmission comprises two pulleys, over which the endless pulling means is guided, at least one of the pulleys being in the form of an adjusting pulley.

To increase the transmission ratio range, the pulling means transmission may comprise a plurality of, for example, two, pulling means which are then passed over a total of at least four pulleys. In such a situation, one belt pulley of the one pulling means is frequently carried on the same axis as a pulling means pulley of the other pulling means and is non-rotatably connected thereto, being for example of an integral construction in the form of a double pulley, as can be seen for example from DE 38 25 091.

However, it is precisely those adjusting pulleys which are varied in terms of their operative diameter by axial displacement of the pulley halves of the adjusting pulley that suffer from the problem that the plane of the pulling means is axially displaced when one pulley half is fixed and one pulley half is axially displaceable. If in that case the other pulley results in the pulling means extending in an inclined position, with the consequence of defective traction and in particular increasing wear on the pulling means.

Therefore, the attempt has already been made in DE 38 25 091 to eliminate that axial displacement by simultaneous axial movement of the carrier on which the adjusting pulleys are disposed. That however entails additional structural expenditure and also means that the adjusting pulleys are mounted in a movable member, that is to say in this case in the variator or variable speed unit, although for other reasons, for example to minimize structural size, it would be desirable if possible for the pulleys of the variator unit to be in the form of fixed pulleys which are not variable in respect of their diameter.

BRIEF SUMMARY OF THE INVENTION

The object in accordance with the present invention is to provide a pulling means transmission which is simple and inexpensive to produce and in terms of its structure and to afford a minimum possible structural space with the largest possible band width in respect of the transmission ratio.

The fact that, within the pulling means transmission, the one or more adjusting pulleys are symmetrically pre-stressed with respect to the plane of the pulling means which runs thereon, means that, upon a variation in the operative diameter of that adjusting pulley, there is no axial displacement of the pulling means and thus no undesirable increase in wear on the pulling means, nor is there any need to compensate for the axial displacement of the pulling means by way of the belt pulleys. In accordance with the invention, when the transmission involves axial pre-stressing of axial pulley halves which make up an adjusting pulley, both pulley halves are pre-stressed in the same manner, that is to say by the same amount and with mutually opposite pre-stressing directions.

In the case of such an adjusting pulley which is composed of pulley halves, the pre-stressing direction is always directed in the direction of the largest operative diameter as otherwise there is no traction effect as between the pulling means and the adjusting pulley. The same applies in regard to an adjusting pulley which is to be varied by radial displacement.

The pre-stressing is effected for example by means of spring force, but it can also be achieved by the pressure of a fluid, that is to say a hydraulic oil or a gas or by magnetic force.

If the pulling means transmission includes two pulling means, wherein two of the pulleys, of which there are then at least four, run on a common axis or shaft, in particular in the form of a double pulley, a preferred embodiment of the invention provides that, of the pulling means pulleys of which there are then a total of at least four, the two outer pulleys which are associated with different pulling means are in the form of adjusting pulleys and the two pulleys which run on an axis or shaft and which are disposed therebetween and which run on a common axis or shaft and which can be moved to and fro jointly in respect of their position between the two outer pulleys are in the form of fixed pulleys, preferably in the form of a double pulley.

That has the advantage that this so-called variator or variable speed unit which includes the two central pulleys, apart from its pivotability, does not have to embrace any further functions such as for example displaceability of the pulleys, and therefore does not become unnecessarily complicated and large. Instead, there is in any case more structural space available in the case of the outer pulleys as the axis of rotation thereof does not have to be displaceable with respect to the surrounding housing so that, at those outer pulleys, it is also easier to provide them in the form of an adjusting pulley.

An embodiment in accordance with the invention is described in greater detail by way of example hereinafter with reference to the drawings in which:

BRIEF DESCRIPTION OF THE DRAWINGS

FIG. 3 shows another variant of the transmission.

DETAILED DESCRIPTION OF THE PREFERRED EMBODIMENT

Figure 1:
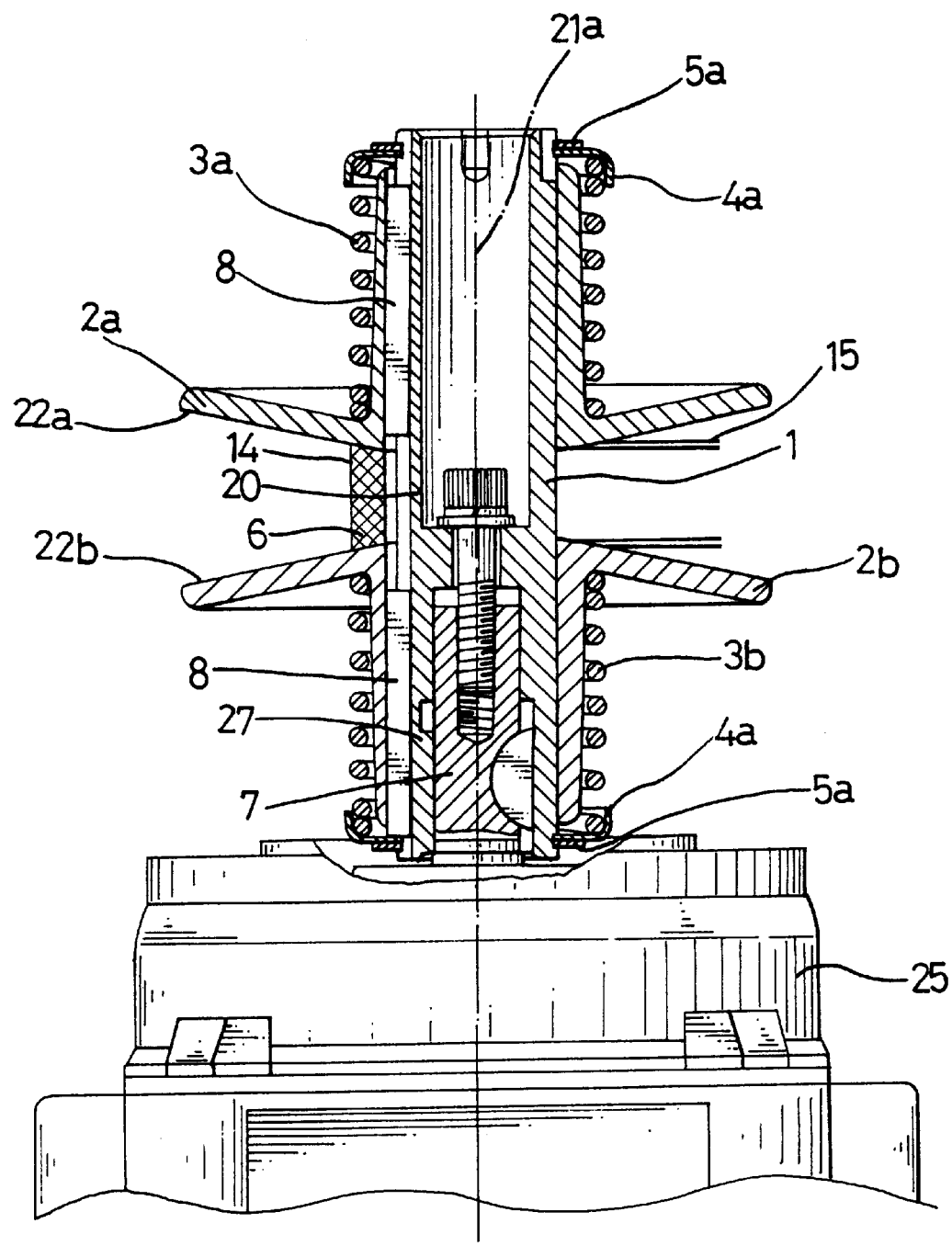
FIG. 1 is a detail view of an adjusting pulley.
Figure 2A:
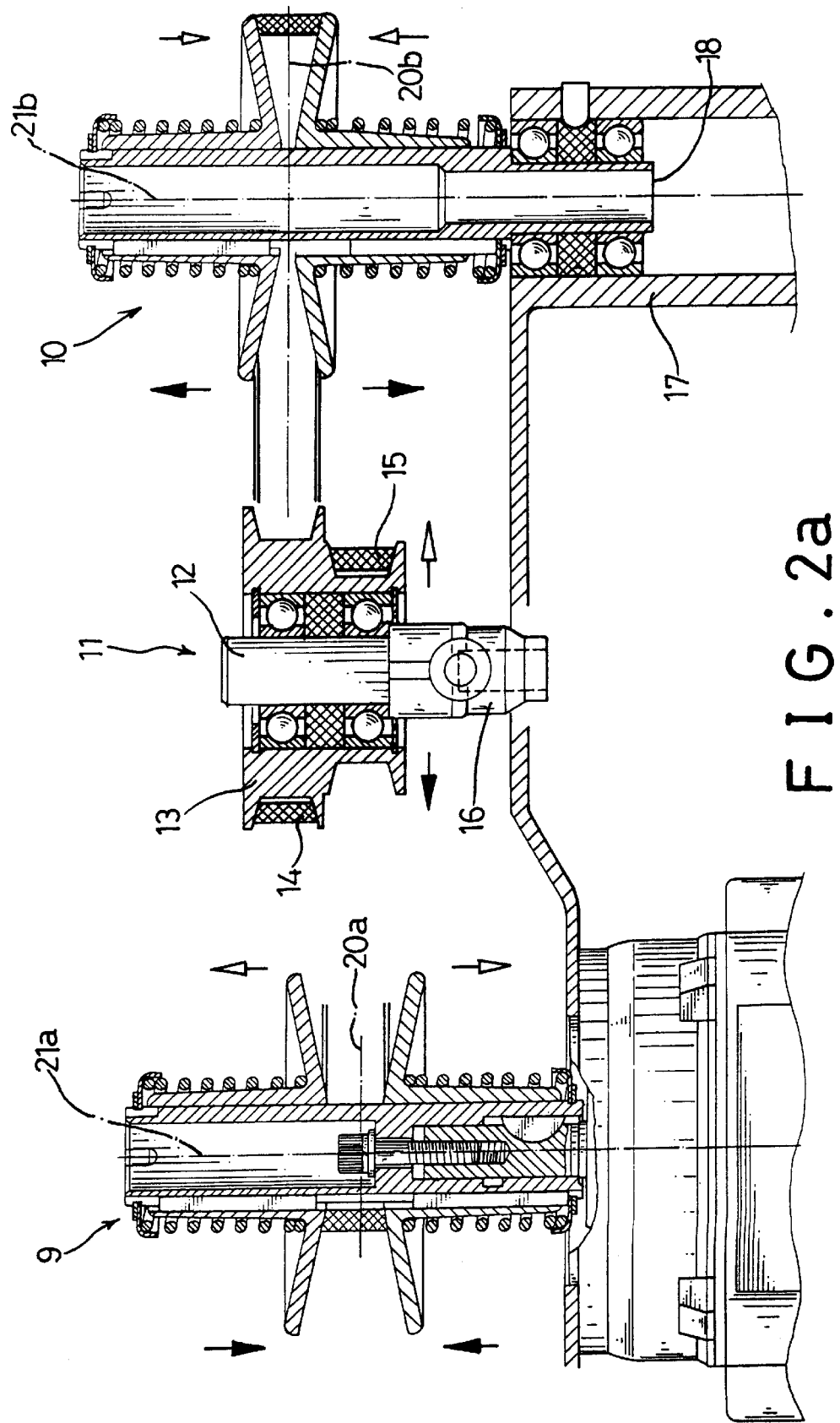
FIG. 2 shows a structural form of the transmission.
Figure 2B:
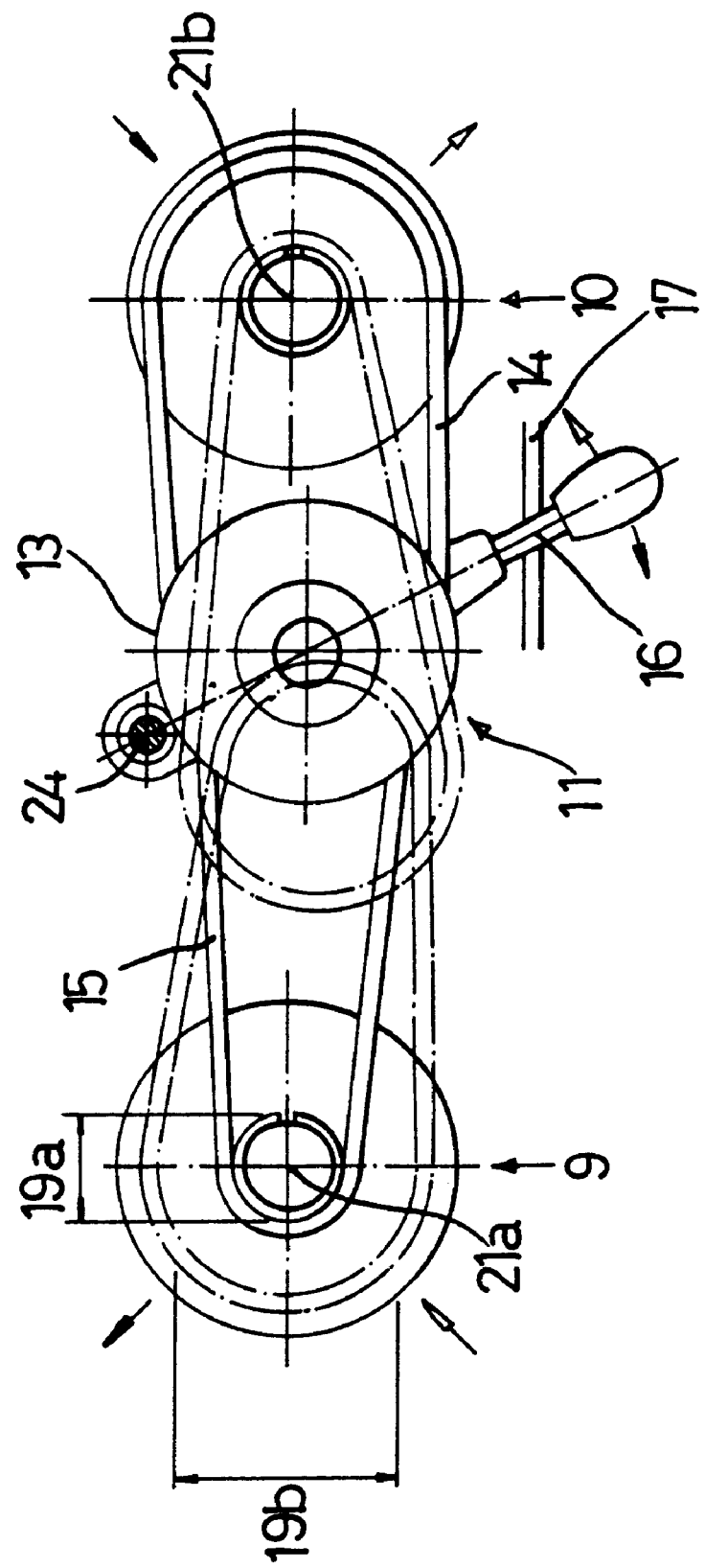

FIG. 2 shows a structural form of the transmission according to the invention in partial vertical section (FIG. 2a) and in plan view (FIG. 2b). FIG. 1 additionally shows in detail on a larger scale the drive adjusting pulley 9 illustrated in FIG. 2.

In the transmission the two outer pulling means pulleys, the drive adjusting pulley 9 and the driven adjusting pulley 10, are in the form of adjusting pulleys insofar as their respective axis of rotation admittedly remains unchanged relative to the housing 17 of the transmission, but their operative diameter is variable, as can best be seen with reference to the view in FIG. 1.

FIG. 1 is a view in longitudinal section of the drive adjusting pulley 9 which is fixed with its shaft non-rotatably on the motor shaft 7 of the driving motor 25. Otherwise however the driven adjusting pulley 9 is of a similar design configuration. Except for the fact that its shaft represents the drive output shaft 18 which can be non-rotatably connected to the unit to be driven, for example the drilling chuck of a drilling machine etc.

Adjustment of the operative diameter is effected by virtue of the face that—reference is best directed to FIG. 1—the adjusting pulley comprises two pulley halves 2a, 2d which engage the pulling means, in this case the drive V-belt 14, in particular a flat V-belt, on opposite sides. The flanks of the belt are arranged in conical relationship with each other and likewise the oppositely directed pulling means running surfaces 22a, 22b of the two pulley halves 2a, 2a are disposed at an angle relative to the pulling means plane 20 in which the V-belt 14 circulates.

Relative movement of the two pulley halves 2a, 2b relative to each other along the axis of rotation of the adjusting pulley causes the axial spacing of the two pulling means running surfaces 22a, 22b relative to each other to be varied, and, because of the fixed width of the V-belt 14 in the axial direction, that if to say in the direction of the axis of rotation 21a of the adjusting pulley, the V-belt 14 which bears against those running surfaces 22a 22b moves radially inwardly or outwardly respectively.

The spacing between the running surfaces 22a and 22b is passively set insofar as the two pulley halves 2a and 2b are respectively pre-stressed or biased from their rear side in the direction of the axis of rotation 21a by means of a spring 3a towards the pulling means plane 20. The springs 3a, 3b are supported by way of a spring plate 4a, 4b and a securing ring 5a, 5b on the end which is respectively remote from the pulley half 2a, 2b, with respect to the shaft 7 of the adjusting pulley.

As the springs 3a, 3b which are arranged coaxially with respect to the shaft 7 are of equal dimensions and in addition vibrations also occur upon rotation of the transmission, the pulling means plane 20, that is to say the middle of the circulating V-belt 14, will always set itself to the middle between the two securing rings 5a and 5b and thus always remain in the same position, irrespective of the spacing of the two running surfaces 22a, 22b relative to each other.

There will therefore be no displacement in the direction of the axis of rotation 21a at the V-belt 14.

The non-rotatable but axially displaceable connection of the pulley halves 2a, 2b with respect to the shaft 27 carrying them is effected in conventional fashion by means of fitting keys 8a, 8b extending in the axial direction, and corresponding but longer groves in the inside periphery of the pulley halves on the one hand and in the outer periphery of the shaft 27; approximately half of each of the keys 8a, 8b engages into the respective groves to afford the non-rotatable connection.

The spacing of the running surfaces 22a, 22b relative to each other is passively adjusted in accordance with the forces which are operative in the plane 20 of the pulling means and which act on the V-belt 14 on the other side of the adjusting pulley.

As FIG. 2 shows, the pulling means transmission comprises two V-belts, the drive V-belt 14 and the drive V-belt 15, of which the former passes around the drive adjusting pulley 9 and the variator unit double pulley 13 while the latter circulates in a plane which is parallel thereto and which is at a somewhat lower position, as shown in FIG. 2a, around the variator double pulley 13 and a driven adjusting pulley 10.

In that arrangement—according to the desired overall step-up or step-down ratio—the two V-belts 14 and 15 run of the variator double pulley 13 on operative diameters which are of different magnitudes but which are fixed and not adjustable.

The variator double pulley 13 is mounted by ball bearing assemblies on a variator shaft 12 which is parallel to the axes of rotation 21a and 21b of the outer adjusting pulleys 9 and 10. The variator shaft 12 in turn is fixed in approximately perpendicular relationship on the variator lever 16 pivotable about a pivot axis 24 which is arranged parallel to the variator axis and which is not disposed on the connecting line between the axes of rotation 21a and 21b of the outer adjusting pulleys.

Pivotal movement of the variator lever 16 causes the spacing of the variator double pulley 13 relative to the axis of rotation 21a of the left-hand adjusting pulley 9 to be for example reduced and at the same time the spacing relative to the axis of rotation 21b of the right-hand adjusting pulley 10 is increased.

As a result an increased pull is applied to the right-hand V-belt 14, whereby the -pulley halves 2a, 2b of the right-hand adjusting pulley 10 are urged apart symmetrically in upward and downward directions and thus their operative diameter is reduced.

Conversely the tension at the left-hand V-belt 114 is reduced whereby the springs 3a, 3b of the left-hand adjusting pulley 9 urge the pulley halves 2a, 2b axially towards each other and the operative diameter at the left-hand adjusting pulley 9 is increased. As a result, in both V-belt 14, 15, the step-up or step-down ratio is altered in the same direction and therefore, with the above-described movement, the speed of rotation of the drive output shaft is increased, with the speed of rotation of the motor 25 remaining the same. The reversed procedure also operates in a similar fashion.

By virtue of the fact that, irrespective of the adjustment of the adjusting pulleys, the V-belt 14, 15 always remain in the same pulling means plane 20a, 20b, adjustment of the variator unit, that is to say the pivotal movement of the variator lever 16 with the variator double pulley 13, can also occur parallel to or in that plane 20, without any need for a compensating movement transversely with respect to that plane. That permits the steplessly operative transmission to be of a very simple and compact structure, as shown in FIG. 2.

A further important advantage of the transmission as shown in FIG. 2 is that the double pulley 13 with its two operative diameters determines the overall transmission ration of the transmission.

By virtue of the fact that for example the double pulley 13 can be removed from the variator shaft 12 and re-fitted in an inverted position, that is to say with the small operative diameter at the top side, with the two V-belts being interchanged at the same time, the transmission ration can already be drastically altered.

It will be appreciated likewise that, instead of the double pulley 13, it is also possible to fit another double pulley with different operative diameters, that then giving a different transmission ratio range for the transmission. It is possible to compensate for the resulting variations in the lengths of the belts passing around the pulleys, for example by displacing the variator shaft 12 along the lever 16.

FIG. 3 shows another structural form of the transmission which differs from the structure shown in FIG. 2 in that the central double pulley 13' is no longer mounted on the variator but is mounted stationarily with its shaft 12', with respect to the housing (not shown). On the contrary, the variator unit 11 comprises two tensioning rollers 23a, 23b which are connected together by way of a tensioning lever 28 and on the ends of which they are rotatably mounted. The one roller 23a is disposed in the pulling means plane 20a and within the V-belt 15. For the tensioning roller 23b, this applies in a similar manner to the V-belt 14.

The tensioning lever 28 is pivotable by means of a variator lever 16 about an axis which is perpendicular to the pulling means plane, in the central region of the lever 28, with the consequence that either the tensioning roller 23b urges the V-belt 14 outwardly or the tensioning roller 23a urges the V-belt 15 outwardly, and thus seeks to increase the length of the path of movement thereof, with the consequence that the V-belt in question urges the two pulley halves 2a, 2b of the corresponding adjusting pulley away from each other, and reduces the operative diameter thereof.

What is claimed is:

1. A pulling means transmission comprising
   two endless pulling means,
   three pulling means pulleys for the two endless pulling means running thereon, wherein one of the pulleys is a double pulley of a fixed diameter and the other two are adjusting pulleys, each adjustable with respect to an operative diameter between two limit positions, and
   a variator unit for displacing the path of travel of at least one pulling means in the respective pulling means planes either with respect to at least one of the adjusting pulleys,
   wherein each adjusting pulley is pre-stressed in one direction towards one of the limit positions and symmetrically pre-stressed with respect to the pulling means planes of the respective pulling means running thereon.

2. The pulling means transmission as claimed in claim 1, wherein each adjusting pulley comprises two pulley halves pulling means running surfaces extending inclinedly relative to the pulling means plane and wherein the pulley halves are axially pre-stressed with the same respective force in a direction towards the central pulling means plane, in particular by means of a compression spring which is arranged axially outside the pulley half and coaxially with respect to the axis of rotation thereof.

3. The pulling means transmission as claimed in claim 1, wherein the double pulley is arranged between the two adjusting pulleys.

4. The pulling means transmission as claimed in claim 1, wherein the variator unit includes the two pulleys which are operatively non-rotatably connected together and is displaceable relative to the axes of rotation of the two adjusting pulleys.

5. The pulling means transmission as claimed in claim 1, wherein the variator unit is pivotable in the pulling means plane about a pivot axis which is perpendicular to the pulling means plane.

6. The pulling means transmission as claimed in claim 1, wherein the two adjusting pulleys are the same in terms of magnitude and pre-stressing direction.

7. The pulling means transmission as claimed in claim 4, wherein the variator unit includes at least one tensioning roller in a travel path of at least one of the pulling means.

8. The pulling means transmission as claimed in claim 4 wherein the variator unit includes a respective tensioning roller in each of the paths of travel of pulling means and the tensioning rollers reciprocally vary the paths of travel of the pulling means by movement of the variator unit.

9. The pulling means transmission as claimed in claim 7, wherein the two pulleys means planes are disposed in mutually parallel relationship.

10. The pulling means transmission as claimed in claim 5, wherein the pivot axis of the variator unit is not identical to the axis of rotation of that of the double pulley, on which runs the pulling means which is guided over an adjusting pulley.

11. A belt transmission with two endlessly circulation belts, comprising:
    four belt pulleys of which two central belt pulleys run in non-rotatably intercoupled relationship as a non-adjustable double belt pulley between the other two belt pulleys as outer pulleys,
    the outer belt pulleys are in the form of adjusting pulleys insofar as they each comprise two pulley halves with pulling means running surface which face inclinedly outwardly from the central pulling means plane, and are symmetrically axially inwardly prestressed by means of compression springs arranged coaxially on the outsides of the pulley halves, and
    the non-adjustable double belt pulley is mounted on a variator unit which is pivotable in the pulling means plane about a pivot axis which is arranged at a spacing relative to the connecting line between the outer adjusting pulleys.

* * * * *